Nov. 23, 1965    A. B. CAREL ETAL    3,219,551
RECEIVER ASSEMBLY FOR VACUUM DISTILLATION APPARATUS
Filed Oct. 26, 1962    2 Sheets-Sheet 1

INVENTORS
ALFRED B. CAREL,
DALE L. KOHLER &
JAMES W. HASTINGS, JR.

BY

*William J. Miller*
ATTORNEY

Nov. 23, 1965 A. B. CAREL ETAL 3,219,551
RECEIVER ASSEMBLY FOR VACUUM DISTILLATION APPARATUS
Filed Oct. 26, 1962 2 Sheets-Sheet 2

INVENTORS
ALFRED B. CAREL,
DALE L. KOHLER &
JAMES W. HASTINGS, Jr.
BY
ATTORNEY

United States Patent Office 3,219,551
Patented Nov. 23, 1965

3,219,551
RECEIVER ASSEMBLY FOR VACUUM
DISTILLATION APPARATUS
Alfred B. Carel, Dale L. Kohler, and James W. Hastings, Jr., Ponca City, Okla., assignors to Continental Oil Company, Ponca City, Okla., a corporation of Delaware
Filed Oct. 26, 1962, Ser. No. 233,319
1 Claim. (Cl. 202—161)

The present invention relates to fractional distillation apparatus which operate at partial vacuum pressures and more particularly, but not by way of limitation, relates to a distillate receiver assembly from which very small samples of the distillate may be taken without materially interrupting the vacuum on the distillation apparatus.

When fractionating a hydrocarbon in the laboratory, it is desirable to run an analysis of the distillate from time to time for various reasons. However, the fractional distillation apparatus presently in common use in the laboratory do not provide a ready means for removing minute samples of the distillate from the system without breaking the vacuum on the distillate receiving vessel before removing a portion of the distillate from the vessel. Then the vessel must be re-evacuated before it is connected back to the vacuum system of the distillation apparatus. Since the receiving vessel must be of substantial volume, the vacuum on the distillation column is nearly always interrupted because the receiving vessel cannot be evacuated to the same pressure as the distillation. Of course, this problem might be overcome by the use of considerable supplemental equipment to accurately establish the desired vacuum pressure, but the additional expense and the considerable effort required of the operator in this procedure would make this method highly undesirable.

Therefore, it is an important object of the present invention to provide a means for quickly and easily removing a very small sample of distillate from fractional distillation equipment operated at a vacuum, without materially interfering with the final material balance of the distillation run and without materially interrupting the vacuum pressure of the apparatus.

Another object of the present invention is to provide a means for withdrawing only that volume of distillate required for analysis while permitting the remainder of the distillate to pass into a receiving vessel.

Still another very important object of the present invention is to provide a receiving apparatus of the type described which will not contaminate the distillate, either that taken as the sample or that collected in the receiving vessel, with the grease used to lubricate and establish a positive seal at the various glass joints of the more conventional laboratory apparatus.

Another object of the present invention is to provide a novel, greaseless ball joint coupling which permits the receiving apparatus constructed in accordance with one embodiment of the present invention to be used in combination with a conventional, commercially available glass fractionation column without modification of the column.

The receiver assembly for a vacuum distillation apparatus constructed in accordance with the present invention may be summarily described as comprising a receiver vessel, a first conduit connected to the distillate withdrawal connection of the column and to the receiving vessel for passing liquid distillate from the column to the receiving vessel, first and second valve means at spaced points in the first conduit for trapping a portion of the distillate otherwise passing to the receiver between the valves, and access means in the first conduit between the first and second valves for removing a portion of the distillate trapped therebetween. A second conduit is also preferably provided for evacuating the receiving vessel when either of the first or second valve means is closed. Further, conduit means and also preferably provided for directly interconnecting the receiving vessel and the vacuum system of the column for equalizing the pressure within the receiving vessel with the pressure within the column. The present invention also contemplates a receiver assembly of this type which is made up of parts having no lubricated joints and yet which may be quickly and easily connected to standard, commercially available fractionation columns.

Additional objects and advantages of the present invention will be evident to those skilled in the art from the following detailed description and drawings, wherein.

Figure 1:
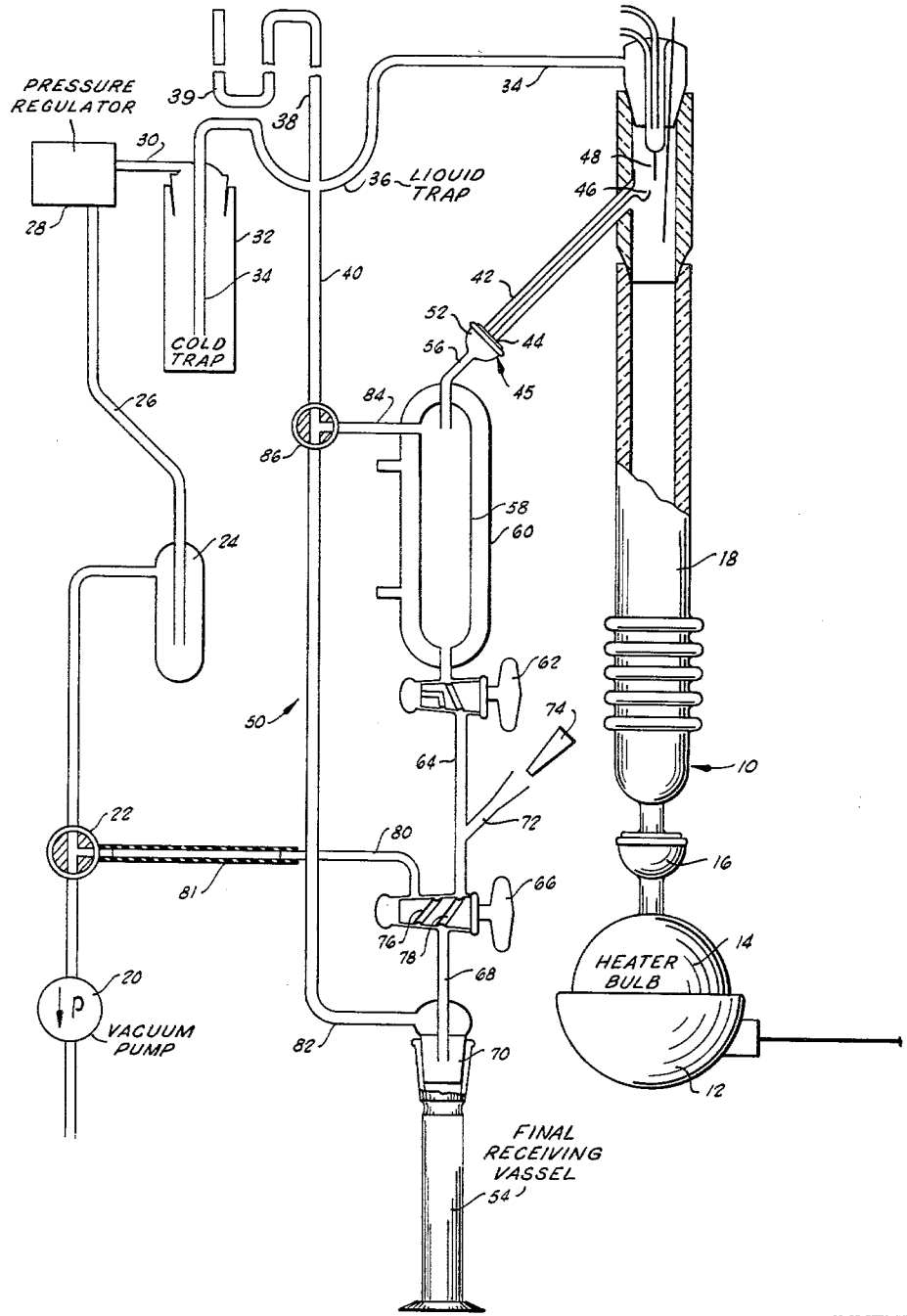
FIG. 1 is a somewhat schematic drawing of a receiver assembly constructed in accordance with the present invention, the receiver assembly being shown in combination with a convention laboratory fractionation apparatus.

Referring now to the drawings, and in particular to FIG. 1, a conventional fractionation apparatus is indicated generally by the reference numeral 10. The fractionation apparatus 10, as it will be appreciated by those skilled in the art, is illustrated only schematically and for convenience of illustration, several necessary connections and internal components are not shown. However, the fractionation apparatus 10 comprises generally a heating unit 12 for heating the hydrocarbon in the bulb 14. The bulb 14 is connected through a ball joint 16 to an elongated column 18.

A vacuum pump 20 is connected through a three-way stopcock 22 to a mercury trap 24. A conduit 26 connects the mercury trap 24 to a pressure regulator 28 which is connected by a conduit 30 to a cold trap 32 for preventing distilled gases from entering the regulator 28 and mercury trap 24, and possibly being ejected from the system through the pump 20. The vacuum system continues from the cold trap 32 through a conduit 34 to a junction 36 which may also incidentally function as a U-shaped liquid trap at a point where a conduit 38 is connected to a manometer 39 for visually indicating the pressure within the vacuum system. A second conduit 40 is also connected to the junction or U-shaped trap 36 and extends to the receiver assembly which will presently be described. By lowering the trap 32 to a position below junction 36, the junction will not need to function as a liquid trap. The conduit 34 is then connected to the top of the fractionation column 18 such that the column 18 will be maintained at the desired subatmospheric or vacuum pressure.

Suitable components are provided within the upper end of the column 18 for condensing the vapor evaporated in the bulb 14 in the conventional manner. Among these components is a distillate withdrawal tap 42 which is connected to the interior of the column 18 and is provided with the male portion 44 of a ball and socket joint, indicated generally by the reference numeral 45. A gutter 46 within the column 18 collects condensed vapors from a conventional stinger 48 which may be shifted over the gutter 46 only a certain percentage of the time by an electromagnetic assembly, such that the major portion of the distillate may be recycled in a manner which is well known in the art.

A receiver assembly constructed in accordance with the present invention is indicated generally by the reference numeral 50. The receiver assembly 50 is connected to the distillate withdrawal tap 42 by the ball and socket joint, the female portion 52 of the ball and socket joint 45 being connected to a conduit 56. The distillate from the connection 46 then passes to a final receiving vessel 54 through the conduit 46, an intermediate receiver 58 which is preferably disposed within a water jacket 60, an upper stopcock 62, an isolation conduit 64, a lower stopcock 66, and a conduit 68 which is connected to the final receiving vessel 54 by a standard, tapered glass joint 70 of substantially greater diameter. An upwardly sloping extraction tube 72 communicates with the isolation conduit 64 and has an open end which is closed by a septum 74.

It will be noted that the stopcock 66 is a three-way valve having parallel diagonal passageways 76 and 78 therethrough. In the position illustrated, the passageway 78 registers with the isolation conduit 64 and the conduit 68. Then upon rotation of the stopcock 66 180°, the passageway 78 will be closed and the diagonal passageway 76 will register with the conduit 68 and with a conduit 80. A conduit 81 which is preferably a flexible hose such as a rubber tube is disconnectably connected to the conduit 80 and to the three-way stopcock 22 such that the final receiving vessel 54 may be evacuated as hereafter described. Both the final receiving vessel 54 and the intermediate receiver 58 are connected to the vacuum system of the column 18 by conduits 82 and 84, respectively, which are connected to a three-way stopcock 86 which in turn is connected to the conduit 40 leading to the bottom of the U-shaped liquid trap 36.

In operation, the receiver assembly 50 is extremely versatile, as will presently be described. For example, assume that the fractionation apparatus 10 is in operation and that distillate is being passed from the gutter 46 to the final receiving vessel 54. In that case, the stopcock 62 would be open, the stopcock 66 would be in the position illustrated so as to permit fluid to pass through the conduits 64 and 68. Also, the three-way stopcock 86 would preferably be in the position illustrated to provide fluid communication between the conduit 40 and both conduits 82 and 84, and thereby equalize the pressure in both the intermediate receiver 58 and the final receiving vessel 54 with the pressure in the column 18 so that the distillate will flow freely downwardly by gravity. Assume now that it is desired to obtain a very small sample of the distillate for analysis. The stopcock 66 is merely turned to prevent fluid passing from the isolation conduit 64 into the conduit 68. The distillate will then very quickly accumulate in the relatively small volume of the isolation conduit 64. The stopcock 62 is then closed to isolate the collected distillate within the isolation conduit 64. The septum 74 may then be removed and a very small quantity of the isolated distillate removed through the extraction tube 72 by a pipette. The septum 74 is then reinserted and the stopcock 66 opened to permit the distillate remaining in the isolation conduit 64 to pass into the final receiving vessel 54 which, it will be appreciated, is at a vacuum pressure equal to the vacuum pressure within the column 18, through the conduit 82 and valve 86. Of course, the stopcock 62 is also opened to permit distillate collected in the intermediate receiver 58 to pass into the final receiving vessel 54.

It will be appreciated that when the stopcock 66 is opened, the atmospheric pressure air which entered the extraction tube 72 and the isolation conduit 64 when the septum 74 was removed will be introduced to the vacuum system of the fractionation apparatus through conduit 40. However, the volume of this atmospheric pressure air is relatively insignificant because of the small volume of the isolation conduit 64 and of the extraction tube 72, and particularly in view of the fact that these are partially filled with distillate when the septum 74 is reinserted. It will also be noted that only sufficient distillate need be removed to perform the necessary analysis, and that the remainder of the distillate trapped in the isolation conduit 64 is then passed into the final receiving vessel 54 so that the final material balance of the various cuts will not be materially affected since only the small sample is removed from the total volume.

Assume now that the analysis shows that it is time to remove the particular cut collected in the final receiving vessel 54 from the system. The three-way stopcock 22 is turned to close the disconnectable conduit 81 from the vacuum pump 20. Stopcock 86 is then rotated 90° counterclockwise to close conduit 82 but leave conduits 40 and 84 in fluid communication. The conduit 81 is then disconnected from the conduit 80 so that atmospheric pressure will be introduced to the conduit 80. When the stopcock 66 is rotated so as to place the passageway 76 in fluid communication with the conduits 68 and 80 and close the isolation conduit 64, atmospheric pressure will be introduced to the final receiving vessel 54. The final receiving vessel 54 can then be easily disconnected from the coupling 70 and the distillate removed therefrom.

After the distillate cut is removed, the final receiving vessel 54 may be reconnected to the coupling 70 by connecting the disconnectable conduit 81 to the conduit 80 and rotating the three-way stopcock 22 to connect the conduit 81 to the vacuum pump 20, which will then evacuate the final receiving vessel 54 such that atmospheric pressure will hold the vessel 54 in place. When the vacuum pressure of the final receiving vessel 54 is approximately equal to the vacuum pressure of the column 18, the stopcock 66 is then rotated to place the isolation conduit 64 and the conduit 68 in communication, and the stopcock 86 is rotated to connect the equalizing conduit 82 in fluid communication with the vacuum system, including the column 18. In the event it is desired to use the intermediate receiver 58 to collect the distillate so that the water jacket 60 may be utilized to either heat or cool the distillate, the stopcock 62 may be closed and the distillate will collect in the intermediate receiver 58. As previously mentioned, the pressure within the intermediate receiver 58 is equalized with the vacuum pressure on the column 18 through the conduit 84, the stopcock 86 and the conduit 40. Small samples may be extracted from the intermediate receiver 58 merely by closing the stopcock 66 and opening the stopcock 62 until the isolation conduit 64 is filled with distillate. Then the stopcock 62 is closed, the septum 74 removed and the sample extracted by a pipette, as previously described. When it is desired to remove all distillate from the intermediate receiver 58, both stopcocks 62 and 66 are opened to permit the distillate to pass into the final receiving vessel 54 whereupon the cut may be removed as described above.

As previously mentioned, in many types of fractionation work in the laboratory, it is essential that the distillate not be contaminated by foreign materials. Frequently, when using the conventional laboratory distillation apparatus comprised of conventional glass tubing and glass fittings lubricated and sealed by a grease, to prevent leakage, the grease will be dissolved into solution with the distillate and interfere with a precise analysis of the distillate. Therefore, an important aspect of the present invention resides in the provision of a receiving apparatus functioning in the manner described above which has no lubricated joints from which grease can be dissolved into the distillate.

Figure 2:
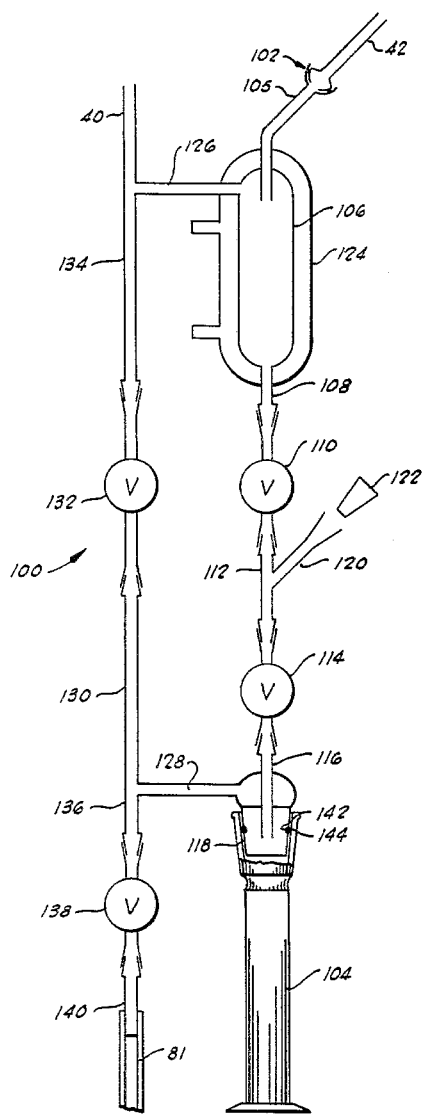
FIG. 2 is a somewhat schematic view of another receiver assembly constructed in accordance with the present invention and features the elimination of all greased fittings.

A greaseless receiver assembly constructed in accordance with the present invention is indicated generally by the reference numeral 100 and is schematically illustrated in FIG. 2. It is to be understood that the receiver assembly 100 is used in combination with the fractionation apparatus 10 in the same manner as the receiver assembly 50 and accordingly it will be noted that the distillate withdrawal tap 42, the conduit 40 and the disconnectable flexible conduit 81 are also illustrated in FIG. 2 in order to show the manner in which the assembly 100 is connected to the apparatus 10. A novel, greaseless ball and socket joint, which is indicated generally by the reference numeral 102 and which will hereafter be described in greater detail, connects the conduit 105 of the receiver assembly 100 to the distillate withdrawal tap 42. Distillate from the tap 42 passes to a final receiving vessel 104 through the conduit 105, an intermediate receiver 106, a conduit 108, a two-way valve 110, an isolation conduit 112, a two-way valve 114, a conduit 116, and a considerably larger tapered glass male joint 118 which is inserted in the upper end of the final receiving vessel 104. An extraction tube 120 is connected to the isolation conduit 112 and is closed by a suitable septum 122.

A water jacket 124 is provided around the intermediate receiver 106 so that the distillate may be heated or cooled as desired. The subatmospheric pressure within the intermediate receiver 106 is continually equalized with that in the fractionation column 18 through a conduit 126 and the conduit 40. Similarly, the pressure within the final receiving vessel 104 is equalized with the subatmospheric pressure in the fractionation column 18 by means of a conduit 128, which is connected to a conduit 130, a two-way valve 132 and a conduit 134 which is connected to the conduit 40. The conduit 128 is also connected through a conduit 136 to a two-way valve 138 and finally to the vacuum pump 20 by means of a conduit 140 which is disconnectably connected to the conduit 81 and therefore to the three-way stopcock 22. The valves 110, 114, 132 and 138 are suitable high vacuum valves which require no grease or other lubricants for sealing or other purposes which might be dissolved into solution with the distillate, and are preferably all metal valves of the type marketed commercially by Hoke, Inc., of Cresskill, New Jersey, as valve No. 416K. The joints between each of the metal valves and the adjacent glass conduits, which are conventional glass tubing, may then be formed by inserting tapered male members on the glass tubing into the flared metallic female coupling members which extend from the metallic valves. The two mating members may then be soldered together in a manner known in the art, or an O-ring seal (not illustrated) may be inserted in an annular groove cut in the tapered male member. Similarly, the male coupling member of the joint 118 may be provided with an annular groove 142 and an O-ring seal 144 and thereby eliminate the lubricating grease normally applied between the ground surfaces on the male coupling member of the joint 118 and the female tapered neck of the final receiving vessel 104.

Figure 3:
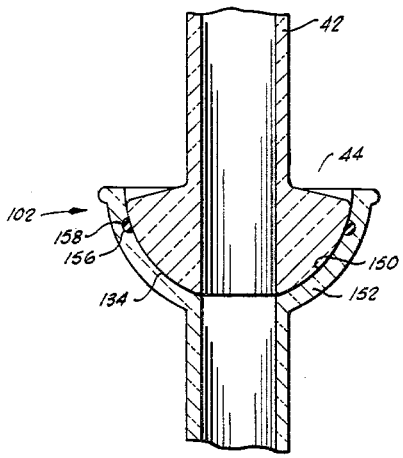
FIG. 3 is a sectional view of a greaseless ball joint constructed in accordance with an important aspect of the present invention; and, FIG. 4 is a sectional view of another greaseless ball joint constructed in accordance with an important aspect of the present invention.

The fractionation column 18 which is available commercially comes equipped with the withdrawal tap 42 and a standard sized male member of the ball and socket joint 45. The conventional ball and socket joint 45 then requires a coat of grease on the spherically ground surfaces of the ball 44 and socket 52 to seal the joint. It will be appreciated that a ball and socket joint at this point is virtually essential in order to eliminate considerable time and effort in precisely aligning the conduit 56 and the withdrawal tap 42 if a standard tapered joint and O-ring seal are used. Therefore, in accordance with an important aspect of the present invention, a novel female member or socket is provided which may be mated with a standard male member or ball without the necessity of applying a grease for assuring a positive seal. This novel construction is illustrated in FIG. 3, wherein the ball and socket joint is indicated generally by the reference numeral 102. The conventional male member 44 formed on the end of the distillate withdrawal tap 42 is of the same type as is used in greased joints and has a spherically ground surface 150. The female member or socket 152 of the ball and socket joint 102 is comprised of a bell shaped portion having a spherically ground interior surface 154 which is adapted to mate with the spherically ground exterior portion 150 of the male member 44. An annular recess 156 is provided in the spherically ground interior surface 154 and receives an annular O-ring seal 158, which perfects a vacuum tight seal around the periphery of the ball joint without a sealing grease.

The spherical, ground surfaces 150 and 154 eliminate the necessity of precise alignment between the conduits 42 and 105 required of more conventional conically tapered joints. Thus it will be noted that the male member or socket of the commercially available fractionation column 18 need not be altered in any manner. Further, the joint may be conveniently utilized, if desired, as a conventional coupling without the O-ring seal 158 by application of the conventional grease to the spherically ground surfaces.

Figure 4:
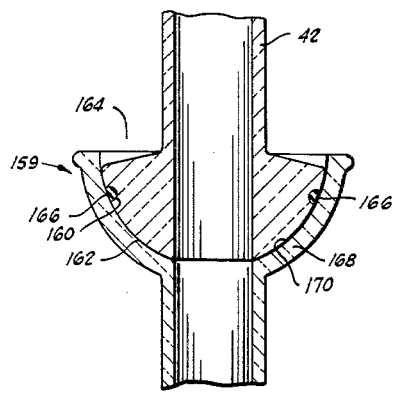

In the event the male member is not connected to the column 18 and can conveniently be turned on a lathe, an annular groove is preferably cut in the spherically ground exterior surface of the male member, as shown in FIG. 4, which illustrates another ball and socket joint, indicated generally by the reference numeral 159, which is constructed in accordance with the present invention. Referring to FIG. 4, an annular groove 160 is cut in the spherically ground exterior surface 162 of the male member or ball 164 of the joint 159, and receives an O-ring seal 166. The female member or socket 168 has a mating, spherically ground interior surface 170 for receiving the ball 164. When the male member or ball 164 is inserted in the female member or socket 168, the O-ring seal 166 will form a vacuum tight seal.

The operation of the receiver assembly 100 is substantially identical with the operation of the receiver assembly 50. For example, during normal operation the valves 110, 114, and 132 will be open such that distillate will pass directly into the final receiving vessel 104 which will be at the same vacuum pressure as the column 18 by means of the open valve 132. Of course the valve 138 should be closed. In order to withdraw a distillate sample for analysis, the valve 114 is first closed until distillate substantially fills the isolation conduit 112 and the sample extraction tube 120. Then the valve 110 is closed, the septum 122 removed and the sample taken by a pipette or other suitable means. After the septum 122 has been reinserted, the valve 114 is opened to permit the trapped distillate to pass into the final receiving vessel 104. The valve 110 may then be opened to resume normal operation.

When it is desired to utilize the intermediate receiver 106, the valve 110 is merely closed. When it is desired to remove the final receiving vessel 104, the valves 114 and 132 are closed, the conduit 81 is disconnected from the conduit 140 and the valve 138 opened to introduce atmospheric pressure into the final receiving vessel 104. After the distillate is removed, the final receiving vessel 104 may be placed back on the male coupling member of the joint 118 and evacuated by connecting the conduit 81 to the conduit 140 and opening the stopcock 22. Then the valve 138 is closed and the valves 132, 110 and 114 opened to resume normal operation.

From the above detailed descriptions of preferred embodiments of the present invention, it will be apparent to those skilled in the art that highly novel and useful receiving assemblies particularly adaptable for use in laboratory fractionation columns have been described. The assemblies permit the very rapid taking of a small sample of distillate for analysis without materially interrupting the vacuum pressure on the fractionation column.

Having thus described several preferred embodiments and subcombinations of the present invention, it is to be understood that various changes, substitutions and alterations can be made therein without departing from the spirit and scope of the present invention as defined by the appended claim.

What is claimed is:

A receiving assembly for a vacuum distillation apparatus having a distillation column, a vacuum pump means connected to the column, and a distillate withdrawal connection, the receiving assembly comprising;
  a receiving vessel in structural communication with the vacuum pump;
  a first conduit system comprising said withdrawal connection in combination with:
    first valve means positioned above said withdrawal connection;
    second valve means positioned below said connection above said receiving vessel, said second valve means being in communication with said vacuum pump whereby said first conduit system is placed in communication with said pump; and
    an intermediate receiving vessel connected in the first conduit system between the distillation column and the first valve means nearest the column;
  a second conduit system connecting the receiving vessel to the distillation column above said distillate withdrawal connection and to the intermediate receiving vessel for equalizing the pressure therebetween; and
  valve means in the second conduit system for closing the second conduit system.

References Cited by the Examiner

UNITED STATES PATENTS

| | | | |
|---|---|---|---|
| 242,768 | 6/1881 | Frankenfield | 285—261 X |
| 2,192,140 | 2/1940 | McCreary | 23—259 X |
| 2,246,436 | 6/1941 | Downey. | |
| 2,374,135 | 4/1945 | Roper | 202—205 |
| 2,434,723 | 1/1948 | Shook | 23—259 X |
| 2,457,384 | 12/1948 | Krenz | 285—261 X |
| 2,573,807 | 11/1951 | Piros et al. | 202—202 X |
| 2,701,789 | 2/1955 | White | 202—161 |
| 2,726,881 | 12/1955 | Howard | 285—261 X |
| 2,791,492 | 5/1957 | Isbell | 23—259 X |
| 2,864,396 | 12/1958 | Isreeli | 285—332.1 |
| 2,909,469 | 10/1959 | Griffith | 23—259 X |
| 3,083,577 | 4/1963 | Nelson | 73—422 X |
| 3,084,554 | 4/1963 | Perilloux | 73—422 X |

FOREIGN PATENTS

| | | |
|---|---|---|
| 28,986 | 1/1925 | France. |

ROBERT F. BURNETT, *Primary Examiner.*

NORMAN YUDKOFF, GEORGE D. MITCHELL,
*Examiners.*